(12) United States Patent
Civanlar et al.

(10) Patent No.: US 6,298,120 B1
(45) Date of Patent: **\*Oct. 2, 2001**

(54) INTELLIGENT PROCESSING FOR ESTABLISHING COMMUNICATION OVER THE INTERNET

(75) Inventors: Seyhan Civanlar, Middletown Township, Monmouth County; William J. Leighton, III, Scotch Plains; Vikram R. Saksena, Freehold, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/671,747

(22) Filed: Jun. 28, 1996

(51) Int. Cl.[7] .............................. H04M 1/64; H04M 7/00; H04M 3/00

(52) U.S. Cl. ....................... 379/88.17; 379/219; 379/244; 379/901; 379/220.01

(58) Field of Search ................... 370/352, 353, 370/380, 389, 392, 396, 401, 404, 427, 435, 450, 465, 485, 400; 379/88.17, 90.01, 219, 93.01, 220.01, 93.05, 229, 242, 93.09, 244, 900, 100.15, 901, 904, 100.16; 709/227, 228; 707/104, 3, 4, 10

(56) References Cited

U.S. PATENT DOCUMENTS

| | | | |
|---|---|---|---|
| 4,191,860 | | 3/1980 | Weber .................................. 179/18 B |
| 4,771,425 | * | 9/1988 | Baran et al. ........................... 370/85 |
| 5,327,486 | * | 7/1994 | Wolff et al. ........................ 379/93.23 |
| 5,526,353 | * | 6/1996 | Henley et al. ........................ 370/60.1 |
| 5,530,852 | * | 6/1996 | Meske, Jr. et al. .................. 395/600 |
| 5,572,643 | * | 11/1996 | Judson ................................. 395/793 |
| 5,583,920 | * | 12/1996 | Wheeler, Jr. ........................... 379/88 |
| 5,604,737 | * | 2/1997 | Iwami et al. .......................... 370/352 |
| 5,608,446 | * | 3/1997 | Carr et al. .................................. 348/6 |
| 5,608,786 | * | 3/1997 | Gordon ................................. 379/100 |
| 5,610,910 | * | 3/1997 | Focsaneanu et al. ................ 370/351 |
| 5,661,790 | * | 8/1997 | Hsu ....................................... 379/209 |
| 5,726,984 | * | 3/1998 | Kubler et al. ........................ 370/349 |
| 5,742,670 | * | 4/1998 | Bennett ................................ 379/142 |
| 5,754,547 | * | 5/1998 | Nakazawa ............................ 370/401 |
| 5,754,938 | * | 5/1998 | Herz et al. ............................. 455/4.2 |
| 5,768,513 | * | 6/1998 | Kuthyar et al. ................. 395/200.34 |
| 5,790,548 | * | 8/1998 | Sistanizadeh et al. ............... 370/401 |
| 5,793,762 | * | 8/1998 | Penners et al. ...................... 370/389 |
| 5,805,587 | * | 9/1998 | Norris et al. ......................... 370/352 |
| 5,884,262 | * | 3/1999 | Wise et al. ........................... 704/270 |
| 5,995,606 | * | 11/1999 | Civinlar et al. ..................... 379/201 |
| 6,009,469 | * | 12/1999 | Mattaway et al. ................... 709/227 |

FOREIGN PATENT DOCUMENTS

| | | |
|---|---|---|
| 0 658 063 A2 | 11/1994 | (EP) . |
| 0 658 063 A3 | 7/1995 | (EP) . |
| 0 732 835 A2 | 3/1996 | (EP) . |
| 0 732 835 A2 | 5/1996 | (EP) . |
| WO 96/38018 | 5/1995 | (WO) . |
| WO 956/38018 | 11/1996 | (WO) . |

OTHER PUBLICATIONS

Colin, "The Internet Telephony Red Herring" Hewlett Packard Publication, May 15, 1996.

\* cited by examiner

*Primary Examiner*—Allan Hoosain

(57) ABSTRACT

A method is disclosed for establishing communication between an originating station and a destination station over a computer network such as the Internet, for example. In accordance with the invention, at least one service attribute requested by the originating station is received over a signaling path. A communication path is then established between the originating and destination stations in conformance with the requested service attribute. The signaling path is an out-of-band signaling path with respect to the communication path.

23 Claims, 3 Drawing Sheets

INTELLIGENT PROCESSING FOR ESTABLISHING COMMUNICATION OVER THE INTERNET

FIELD OF THE INVENTION

This invention relates generally to a method for establishing communication over a computer network and more particularly to a method for establishing communication over the Internet with Intelligent processing.

BACKGROUND OF THE INVENTION

Intelligent network telephone call processing is now quite common. For example, when an "800" number or "toll-free" number is dialed, the call can be routed to a regular telephone number, and the charge for that call may be billed to the called number. In order to process the call, a database is queried to determine or define the actual destination for the call. Characteristics concerning the handling of the call, such as routing, can thus involve not only the dialed number, but also various other factors, such as the location where the call originated, information indicating the history of the caller, and the day of the week or the time of day that the call is being made.

FIG. 1 shows in simplified form an intelligent telephone network 100. Telephone network 100 comprises originating stations 102 and 104, destination stations 114 and 116, and long-distance network 118, illustratively the AT&T network. Originating stations 102 and 104 are representative of a plurality of network endpoints, the remainder of which are not shown for clarify of exposition. Only those portions of the telephone network necessary for completing calls from an originating station to a destination station are shown.

LEC networks 106, 108, 110, and 112 contain switching machines 120, 122, 124, and 126, respectively. Switching machines 120, 122, 124, and 126 are capable of connecting to the long distance network 118. Such switching machines are well known and may be, for example, AT&T 5ESS® switch. Long distance network 118 comprises switching machines 128 and 130, network control point (NCP) 132 and optional adjunct processor 136. NCP 132 is of a type well known in the art, an example of which is disclosed in U.S. Pat. No. 4,191,860. Switching machines 128 and 130, NCP 132, and AP 136 are interconnected in the manner shown by signaling network 138, represented by dashed lines. Signaling network 138, which may be an SS7 system, for example, allows switching machines 128 and 130 to query NCP 132. Information received in response to such queries may be returned to the switch in the form of data messages. Originating stations 102 and 104, destination stations 114 and 116, switching machines 120, 122, 124, and 126, and switching machines 128 and 130 are interconnected by information links 140 in the manner shown. Information links 140 are of well known types for interconnecting communicating apparatus and can carry at least voice, data and video.

Depending upon the particular arrangement of the elements in network 100, switch 128 may, responsive to receipt of a dialed number recognized as a number requiring "intelligent call processing," launch a query, via the signaling network 138, to the NCP 132, in order to retrieve a destination number that is associated with the dialed number. After the query is launched, the destination number corresponding to the dialed number may be ascertained and returned to switch 128, assuming there is an appropriate entry in NCP 132. This destination number is then used to route the call through the other elements of network 100 to the appropriate destination, such as destination station 114.

It should be noted that the signaling path between the switches 128 and 130 and the NCP 132, denoted by signaling network 138, is distinct from the actual communication path between any of the originating stations 102 and 104 and any of the destination stations 114 and 116. That is, the query from the switch 128 to the NCP 132 employs out-of-band signaling to provide intelligent call services such as 800, 900 and ISDN services. In contrast, in-band signaling is carried along the same communication path as the data. For example, in a conventional telephone call, in-band signaling may be accomplished by touch tone dialing, in which numbers are pressed on the telephone keypad to transmit signals.

SUMMARY OF THE INVENTION

The present inventors have recognized that it would be advantageous to provide networks other than the telephone network with out-of-band signaling capabilities so that an origination station or client may perform a transaction having service attributes requiring intelligent processing.

The present invention provides a method for establishing communication between an originating station and a destination station over a computer network such as the Internet, for example. In accordance with the invention, at least one service attribute requested by the originating station is received over a signaling path. A communication path is then established between the originating and destination stations in conformance with the requested service attribute. The signaling path is an out-of-band signaling path with respect to the communication path.

DETAILED DESCRIPTION

The network that will be used for illustrative purposes only to facilitate an understanding of the invention is the Internet. However, as one of ordinary skill in the art will recognize, the present invention is more broadly applicable to other computer networks.

Figure 1:
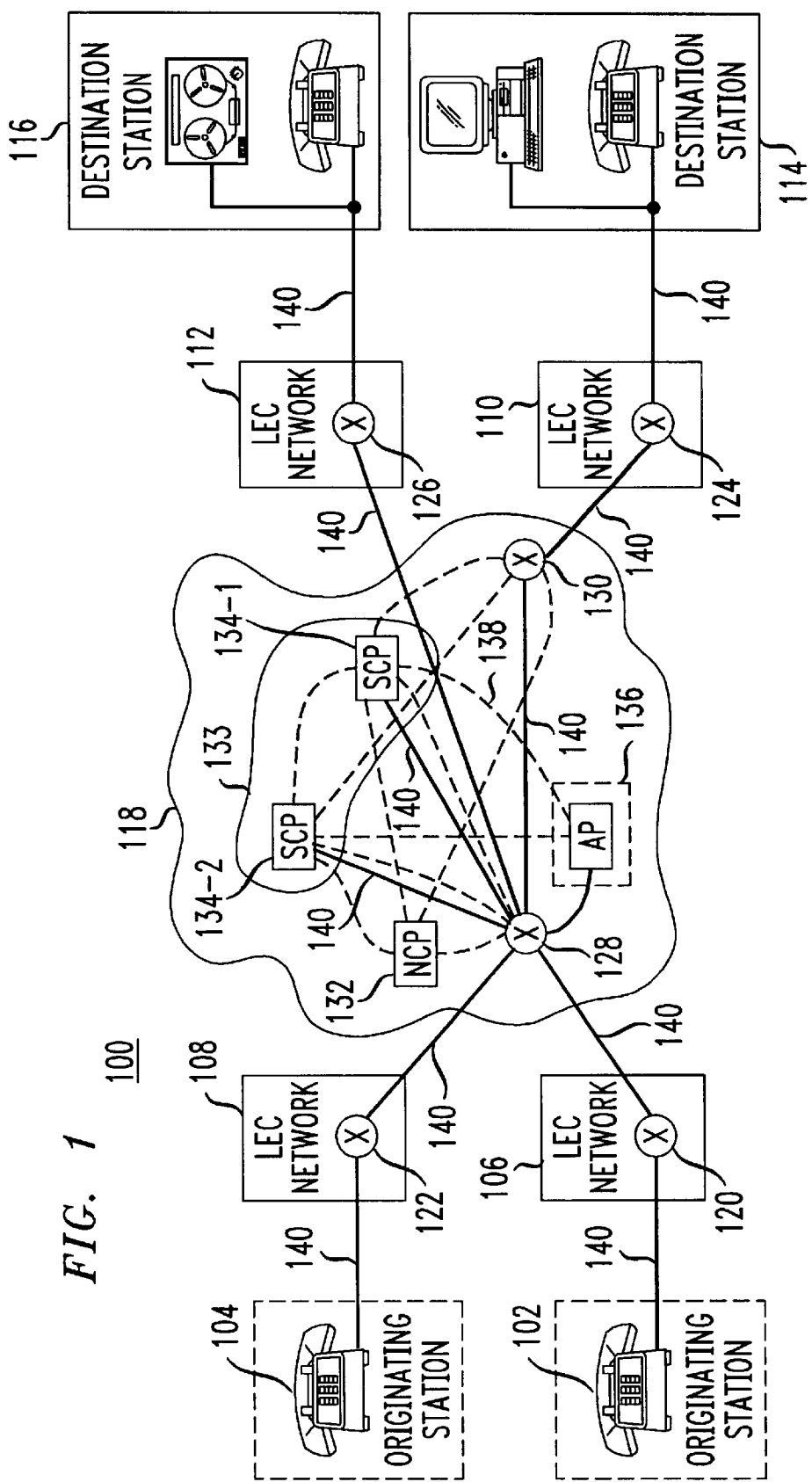
FIG. 1 shows a simplified schematic drawing of a known intelligent telephone network.
Figure 2:
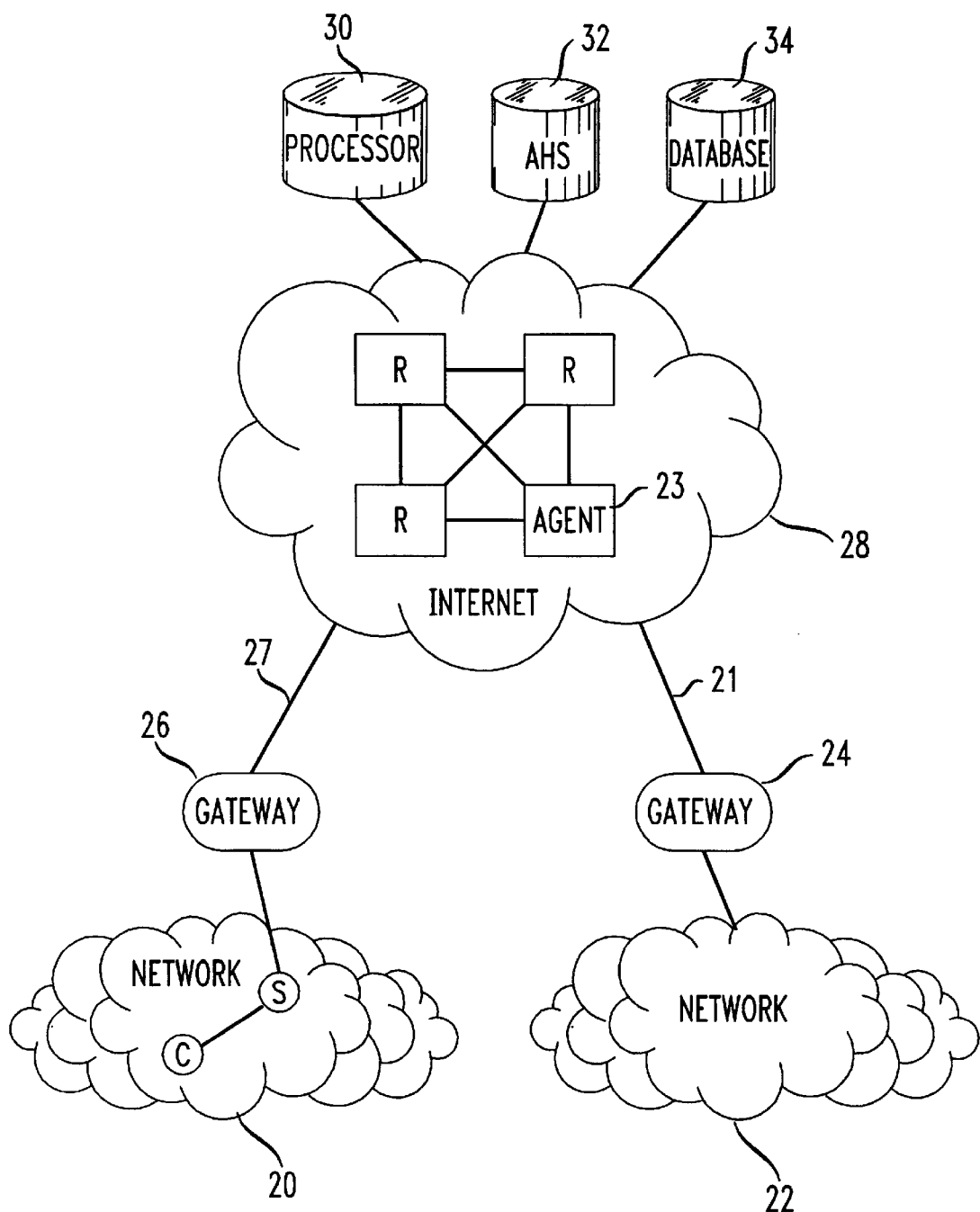
FIG. 2 shows an example of individual computer networks interconnected via the Internet.

In contrast to the telephone network, the Internet is an example of a packet switched computer network having an open architecture. The Internet is a collection of various heterogeneous networks that may employ different hardware and different operating systems. While the Internet is typically considered a public network, privately maintained networks such as Worldnet, for example, may also be classified as Internet networks. These divergent systems communicate via the Internet Protocol (IP). FIG. 2 shows an example of individual computer networks 20 and 22 that communicate with one another via the Internet 28. The networks 20 and 22 connect to gateways 26 and 24, respectively. Gateways 24 and 26 connect in turn to the Internet 28 via transmission media 21 and 27, respectively.

One particular service protocol available on the Internet is the World Wide Web (WWW). The WWW provides an interface that simplifies the process of accessing data on the Internet and eases the distribution of information. The WWW employs traditional Internet protocols such as ftp, telnet and email, as well as a new IP-based protocol, called the Hyper Text Transfer Protocol (HTTP). The HTTP protocol defines client-server interactions primarily to distribute HyperText documents which contain plain-text, audio and video.

In the client-server model of HTTP, a client program running on the client's station sends a message over the Internet requesting the provision of a service available from a server program running on a remotely located server. The server responds to the request by sending a message back to the client. The protocols used to exchange these messages include such well-known protocols as ftp, gopher and other Internet client-server protocols, all of which are made available through a WWW browser. The HTTP protocol is primarily used to deliver HyperText documents from an HTTP server to a user. An HTTP server is similar to an anonymous ftp server, which delivers files upon a client's request. However, the HTTP server not only forwards files to the client, but also forwards the results that are output by programs that are executed on the HTTP server or on other servers. The programs located on the HTTP server that communicate with the client are referred to as gateway programs because they act as a gateway between the HTTP server and the local resources on the server such as databases. An HTTP server can access many different gateway programs upon a client's request.

HyperText documents are prepared in the HyperText Markup Language (HTML) to be distributed on the WWW. HTML allows information to be retrieved in a non-hierarchical manner by providing links from one document to another on the Internet. The links may connect the user to documents that employ text, video and/or audio. It is this feature of HTML that allows a user to select a highlighted portion of a document and access a new document stored on a remotely located machine. HTML transmits information to HTTP servers, which in turn execute appropriate programs, the outcomes of which are presented to the user either through an HTML page or through a program running on the client.

In accordance with the present invention, an open computer network such as the Internet is provided with out-of-band signaling capabilities so that a client may perform a transaction having service attributes requiring intelligent processing. The procedure employed by a client to perform such a transaction will be described with reference to the network shown in FIG. 2. As seen in FIG. 2, in accordance with the present invention an Internet server 23 functions as an agent or proxy through which a client or other station may establish out-of-band signaling to perform special services. The signaling network over which out-of-band signaling is achieved may physically reside on the computer network itself, while being logically disjoint therefrom, as in FIG. 2. If the open network over which the invention is employed is the WWW, the agent 23 may be an HTTP server that is managed by a third-party service provider. The agent 23, similar to an NCP in the telephone network, contains a database of service attributes concerning data paths, clients, and other end-point stations and other attributes pertaining to the quality of service. Moreover, the agent 23 may function as a proxy for a client by downloading applications that are needed to facilitate the communication session requested by the client. That is, the agent 23 may act as a virtual server or client on behalf of an actual server or client. Additionally, the agent 23 may transmit applications required to conduct a particular session requested by an end-user and which is not locally available to the end-user. For example, the client may request a multimedia session that requires special software only available through the agent 23. For example, agent 23 may be employed to convert MPEG data to JPEG data that is recognizable by the client. The agent 23 may also establish the data path (i.e., the in-band signaling path) between clients though which data will pass. In this role the agent 23 provides a function analogous to that provided by an NCP in establishing a toll-free telephone call. The agent 23 will typically communicate with other intelligent sources such as NCPs located in the telephone network, routing servers, and DNSs, for example.

The client communicates with the Internet via a web-browser on an HTTP server. The hardware employed by the client may include, but is not limited to, a personal computer, a telephone, a workstation, or even a television. The client may access the Internet via any of a variety of access alternatives, including: a Local Area, Network (LAN) connection such as Ethernet or Token Ring; a private line; a dial connection using PPP, ISDN BRI or ISDN PRI; an ATM or Frame Relay connection; a wireless connection; or, a cable connection. The client may have the capability of simultaneously communicating through multiple access alternatives. This capability allows the client to communicate with different networks to select communications paths based on particular application needs.

The signaling path between the agent and the client or other end point station is referred to as out-of-band because the signaling path may be different from the data communication path. However, the signaling path and the data communication path may share portions of the same physical link. For example, the signaling and data paths may be on the same routed network, but the data path may employ a better quality of service path. Alternatively, the data path may be routed over a packet-switched or circuit-switched network.

Figure 3:
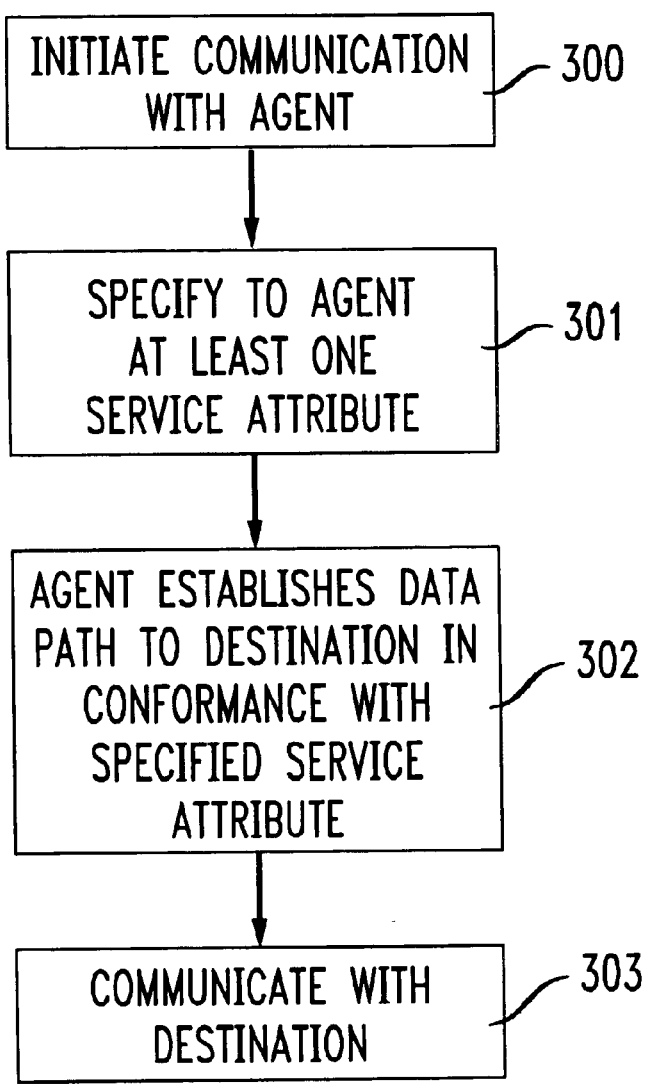
FIG. 3 shows a flow chart of the steps performed by a client to complete a transaction over the Internet in accordance with the present invention.

FIG. 3 shows a flow chart delineating the steps performed by a client to complete a transaction over the Internet which requires intelligent processing. First, in step 300, the client initiates communication with the agent that functions in operative cooperation with the Internet. Next, in step 301, the client specifies to the agent one or more desired service attributes which require intelligent processing. For purposes of illustration service attributes may be classified into one of three categories: end-point attributes, path attributes, and call attributes. End-point attributes include such attributes as the name and network address of the destination station, the type of file transmission that is desired (e.g., one-way transmission for file retrieval only or two-way file transfer), and the media to be employed (e.g., audio, text, video, etc.). Path attributes specify the communication medium to be employed (e.g., telephone network, ATM, frame relay, etc.) and the quality of service that is desired. Call attributes include billing preferences (e.g. specifying the party who will pay for the call), the time and date at which the call is to be initiated, call authentication requirements, and whether proxy services will be required to perform a task such as downloading an application, for example.

The agent establishes the appropriate data path in step 302 upon receiving a call request having specified call attributes. The agent communicates with various switches located in the networks of the originating client and the destination client to properly established the communication session. The agent may employ other end-point stations to initiate the call set-up, or alternatively, the agent may designate a proxy to connect originating and destination stations in those situations where communication formats between the stations are not compatible. The agent performs these functions by maintaining an updated database that includes the identification of end-point stations having the capability of providing special service attributes, a list of the various service attributes available to the agent, and available data paths. Finally, in step 303, after the connection has been established in accordance with the service attributes requested by the client, the client communicates with the destination station in a conventional manner.

The following discussion provides additional details concerning the functionality of the agent when operating on the Internet. As previously noted, the client initiates a call by making a call request using, for example a web-page. The request may include one or more desired service attributes. Once the client makes a selection on the web-page, the web-page forwards the request to the agent. The agent screens the request to determine if the call needs special processing. If such special processing is required because certain service attributes have been specified, the agent makes an appropriate database query to complete the call. The agent is connected to various databases via a backbone network connected to the signaling network. The backbone network may be the public Internet, a privately-owned Internet, or other data network dedicated to the signaling network.

As previously noted, the databases queried by the agent facilitate the implementation of various service attributes. In addition to the service attributes previously mentioned, additional service attributes may include: address validation (of the calling and called parties); authentication/security check; credit card validation; billing record generation; application translation service; application hosting service; customer care; close user group addressing; and directory services. Other service attributes may pertain to protocol address translation, e.g., from IP to IP (such as from a virtual IP address to a real address), from IP to ATM, from IP to a telephone number, or from IP to MAC. Of course, the enumerated list of service attributes is presented for illustrative purposes only. More generally, the invention is applicable to an agent that implements any service attribute that may be desired.

The agent determines the appropriate database or databases to be queried based on the service attributes that the client requests. For example, if the client requests a service attribute that it cannot execute itself, the agent cooperates with an "application translation service" processor 30 (see FIG. 2), which may transmit the appropriate software to the client so that the client can execute the requested application, or alternatively, the agent requests the application translation service processor to translate the application into a form that the client can execute. In the latter case the application translation processor 30 may elect a proxy server in the network along the communication/data path to receive the application from the called party, translate it into a form that the calling party can execute, and then forward it to the calling party.

Some database queries may arise when the client requests receipt of a video file over a broadband network having a high quality of service. In this situation the agent cooperates with the "application hosting service" (ASH) 32 to locate an application server in the network that can transmit the requested file over a broadband network. After such a determination is made, the agent makes the appropriate address translations using the "address translation service" (ADS) to ensure that the client and server are provided with proper addresses (e.g. ATM addresses) to establish a call on a broadband network.

Many applications require authentication for security reasons. The agent authenticates a client by querying a database. Similarly, services that require provision of a credit card number can use a service that allows the agent to either verify the card number or simply obtain the credit card number from a database 34 and complete the call.

The agent may also determine the type of communication path that needs to be established between the calling, and the called party, regardless of whether the communication path employs the public Internet, an internet that is privately owned and managed, the circuit switched telephone network, or a packet network such as an ATM or frame relay network. The agent determines the appropriate communication path based on either the request of the client (calling or called) or based on the quality of service requirements of a particular application operating between the called and calling party. For example, depending on whether the application is point-to-point or multipoint, the agent may select one of the following types of end point connectivities: one-to-one; one-to-many; many-to-many; or many-to-one.

The agent may also determine whether a conventional signaling query (such as that in SS7, for example) is needed in addition to the out-of-band signaling performed over the Internet. If a conventional signaling query is required, the agent generates the appropriate signaling message and transmits it to the conventional signaling network on behalf of the client. For example, conventional signaling may be required when providing 800 data service. In this case conventional signaling occurs to perform the translation in an NCP of the 800 number to the actual endpoint telephone number.

The agent may be arranged in a centralized or distributed manner. For example, the agent can be functionally subdivided such that different functions reside on separate physical devices. Similarly, the agent may employ single or multiple processors to communicate with the various databases that are required. The signaling protocol that operates between the agent and the processors may be IP-based (e.g., HTTP, or other IP-based protocols). The protocol operating between the client and the agent and between the agent and the databases may be different than the protocol operating between the agent and the processes.

What is claimed is:

1. A method for establishing communication via a packet network between an originating station connected to said packet network and a destination station connected to said packet network comprising the steps of:

said originating station connecting to an agent subsystem, which is a subsystem that participates in said communication but is distinct from network elements that are included in a dataflow path of said communication;

said originating station sending a message to said agent subsystem, over a signaling network that uses physical links of said packet network but is logically disjoint from a communication network composed on elements of said packet network, where said message includes at least one service attribute from a set containing end-point attributes, path attributes or call attributes requested by the originating station; and said agent subsystem establishing a communication path between said originating station and said destination station, over said communication network, in conformance with said requested service attribute.

2. The method of claim 1 where said signaling network is logically disjoint from a communicating network that is formed from said physical links and which is used for communication information between stations over said packet network.

3. The method of claim 1 where said agent subsystem, in establishing said communication path between said originating station and said terminating station, is coupled to said communication path, and acts as a virtual originating station to said destination station.

4. The method of claim 1 where said agent subsystem, in establishing said communication path between said originating station and said destination station, is coupled to said communication path, and acts as a virtual destination station to said destination station.

5. The method of claim 1 where said agent subsystem employs information to assist in said step of establishing said communication path, which information relates to data paths that are available in said communication network, and attributes relating to quality of service.

6. The method of claim 5 where said information that is employed by said agent subsystem is included in databases maintained by said agent subsystem.

7. The method of claim 5 where said information that is employed by said agent subsystem is obtained by said agent subsystem from a network control point located in a telephone network.

8. The method of claim 1 where said service attribute relates to name of said destination station or address of said destination station.

9. The method of claim 1 where said service attribute relates to type of file transmission that is desired or media that is to be employed is said communication between said originating station and said destination station.

10. The method of claim 1 where said service attribute relates to type of communication medium that is to be employed in establishing said communication path.

11. The method of claim 1 where said service attribute relates to quality of service in said communication between said originating station and said destination station.

12. The method of claim 1 where said service attribute relates to billing preferences, time and data at which said communication path is to be established, or whether proxy service on the part of said agent subsystem are called for.

13. The method of claim 1 where said service attribute relates to a service that requires processing other than merely processing that attends the establishment of a communication path.

14. The method of claim 13 where said processing includes one or more of a set that includes address validation, billing record generation, application translation service, authentication check, security check, credit card validation, customer care, protocol address translation, and directory services.

15. The method of claim 1 where said step of said originating station connecting to an agent subsystem results in said agent subsystem providing a web page to said originating station, and said step of said originating station sending a message that employs said web page.

16. The method of claim 1 where said agent subsystem is a server connected to said packet network.

17. The method of claim 1 where said agent subsystem is distributed over a number of physically disjoint apparatus.

18. The method of claim 17 where said physically disjoint apparatus are all connected to said packet network.

19. A method for providing communication between an originating station and a destination station over a packet-based computer network having a communication path with a user-defined quality of service options, said method comprising the steps of:

transmitting to the originating station over a signaling path on said packet-based computer network a signal requesting the originating station to make a selection of quality of service;

receiving, in response to said request, at least one quality of service option requested by the user;

establishing a communication path between the originating and destination stations in conformance with said requested quality of service option, wherein said signaling path resides in said packet-based computer network the same as the communications path but is out of band path with respect to the communication path.

20. A method for establishing communication via a packet network between an originating station connected to said packet network and a destination station connected to said packet network comprising the steps of:

said originating station connecting to an agent subsystem;

said originating station sending a message to said agent subsystem, over a signaling network, where said message includes at least one service attribute from a set containing end-point attributes, path attributes or call attributes; and said agent subsystem establishing a communication path between said originating station and said destination station, over a communication network composed of elements of said packet network, in conformance with said requested service attribute, where said communication network is logically disjoint from said signaling network.

21. A method for establishing communication via a packet network between an originating station connected to said packet network and a destination station connected to said packet network comprising the steps of:

said originating station connecting to an agent subsystem;

said originating station sending a message to said agent subsystem, over a signaling network that uses physical links of said packet network, where said message includes at least one service attribute from a set containing end-point attributes, path attributes or call attributes requested by the originating station; and said agent subsystem establishing a communication path between said originating station and said destination station, over a communication network that is composed of elements of said packet network, in conformance with said requested service attribute, where said communication network is logically disjoint from said signaling network;

where said agent subsystem is an http server that is connected to said packet network and that is commercially controlled by other than the party that controls said originating station or the party that controls said destination station.

22. A method for establishing communication via a packet network between an originating station connected to said packet network and a destination station connected to said packet network comprising the steps of:

said originating station connecting to an agent subsystem;

said originating station sending a message to said agent subsystem, over a signaling network that uses physical links of said packet network, where said message includes at least one service attribute requiring intelligent processing from a set including a plurality of service attributes requested by the originating station; and said agent subsystem establishing a communication path between said originating station and said destination station, over a communication network that is composed of elements of said packet network, in conformance with said requested service attribute, where said communication network is logically disjoint from said signaling network;

where said agent subsystem downloads an application to said originating station prior to said agent subsystem establishing communication between said originating station and said destination station.

23. The method of claim 22 where said application is necessary to facilitate communication between said originating stations and said terminating station.

\* \* \* \* \*